United States Patent
Boman et al.

(10) Patent No.: US 6,889,189 B2
(45) Date of Patent: May 3, 2005

(54) SPEECH RECOGNIZER PERFORMANCE IN CAR AND HOME APPLICATIONS UTILIZING NOVEL MULTIPLE MICROPHONE CONFIGURATIONS

(75) Inventors: Robert Boman, Thousand Oaks, CA (US); Luca Rigazio, Santa Barbara, CA (US); Brian Hanson, Goleta, CA (US); Rathinavelu Chengalvarayan, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 48 days.

(21) Appl. No.: 10/672,167

(22) Filed: Sep. 26, 2003

(65) Prior Publication Data

US 2005/0071159 A1 Mar. 31, 2005

(51) Int. Cl.[7] ............................................. G10L 21/00
(52) U.S. Cl. ....................................... 704/270; 704/275
(58) Field of Search ................................ 704/270, 275, 704/278

(56) References Cited

U.S. PATENT DOCUMENTS 5,400,409 A    3/1995  Linhard ....................... 381/92
6,167,417 A  * 12/2000  Parra et al. ................. 708/405
2002/0142734 A1  10/2002  Wickstead

* cited by examiner

Primary Examiner—Susan McFadden
(74) Attorney, Agent, or Firm—Harness, Dickey & Pierce, PLC

(57) ABSTRACT

System speakers are switched to function as sound input transducers to improve recognizer performance and to support recognizer features. A crossbar switch is selectively activated, either manually or under software control, to allow system loudspeakers to function as sound input transducers that supplement the recognition system microphone or microphone array. Using loudspeakers as "microphones" improves speech recognition in noisy environments, thus attaining better recognition performance with little added system cost. The loudspeakers, positioned in physically separate locations also provide spatial information that can be used to determine the location of the person speaking and thereby offer different functionality for different persons. Acoustic models are selected based on environmental and vehicle operating conditions and may be adapted dynamically using ambient information obtained using the loudspeakers as sound input transducers.

38 Claims, 6 Drawing Sheets

SPEECH RECOGNIZER PERFORMANCE IN CAR AND HOME APPLICATIONS UTILIZING NOVEL MULTIPLE MICROPHONE CONFIGURATIONS

FIELD OF THE INVENTION

The present invention relates generally to speech recognition systems. More particularly, the invention relates to an improved recognizer system, useful in a variety of applications and with a variety of electronic systems that use loudspeakers to provide sound to the user. The invention advantageously switches the loudspeakers from their normal sound reproduction mode to a voice or sound input mode and the voice or sound signal so input is then processed to enhance recognizer performance and to support additional recognizer features.

BACKGROUND OF THE INVENTION

To deploy an automatic speech recognizer in an automobile, or at another location, one or more microphones may need to be installed. Using multiple microphones can improve recognition results in noisy environments, but the installation costs can be prohibitive, particularly where the recognition system is installed in a system that was not originally designed for that purpose. In automotive applications, speech recognition features are typically integrated into the audio system of the car, using a single microphone, or a microphone array, that has a single cable for connecting it to the audio system. In such case, the audio system includes an input port to which the microphone cable is connected. Thus, even when the audio system includes such a port, it can be cost prohibitive to retrofit such an audio system with a recognizer that takes advantages of additional microphones (i.e., microphones in addition to the microphone or microphone array that was engineered for the system).

Using multiple microphones helps with removing noise. It also helps when more than one person is speaking, as the recognizer may be able to select the desired speaker by utilizing spatial information. In a multiple microphone system, this would be done by properly combining the signals received from the multiple microphones to acquire the spatial information. In an automotive application, it could be useful to have a recognition system that responds to certain voice commands only when uttered by the vehicle driver. With a single microphone, it can be very difficult to determine whether the person uttering the command is the driver, as opposed to another vehicle passenger. With multiple microphones it is much easier to discriminate among the speakers, particularly if the microphones are scattered throughout the vehicle. However, with current technology there is no economical way to accomplish this.

Using multiple microphones can also be beneficial in other applications. A second exemplary application involves deployment of automatic speech recognition for control of home entertainment systems. As in the car application, multiple microphones can help to remove noise and to select the desired speaker. Additionally, in home applications multiple microphones can be further applied to help reduce the adverse effects upon speech recognition of room reverberations.

SUMMARY OF THE INVENTION

The present invention provides an improved speech recognition system that may be coupled to an audio system or audio/video system to add speech recognition features to those systems and improve recognition performance. The system employs a multi-channel signal processor and a signal switch. The switch is adapted for placement between the audio system or audio/video system and the associated loudspeakers. In one state, the switch connects the loudspeakers to the audio system, so that the audio signal content may be supplied to the speakers for playback in the usual fashion. When switched to a second state, the switch decouples the loudspeakers from the audio system and instead couples them to input channels (one channel per loudspeaker) of the multi-channel signal processor. A microphone is coupled to another input channel of the multi-channel signal processor. The signal processor may be configured to provide a number of different processing operations, such as noise removal operations and spatial speaker localization operations. The output of the multi-channel processor may be fed to a speech recognizer which in turn controls system functions within the audio system or audio/video system.

Another aspect of the invention involves the automatic inclusion of environmental conditions to achieve more accurate speech recognition in noisy environments, such as within automotive vehicles. Speech recognition from a moving vehicle can be severely degraded by the ambient noise. The ambient noise in a vehicle is typically a time-varying phenomenon and may emanate from a variety of different sources such as:

noise from the engine and the revolving mechanical parts of the vehicle, vibration noise from the surface contact of the wheels and roadway, the noise from air drawn into the vehicle through ducts or open windows, noise from passing/overtaking vehicles, clicks from turn indicators, etc. Each type of vehicle generates different noise frequency characteristics (e.g., BMW series generates wide-band noises and Volvo series generates narrow-band noises).

The improved recognizer system of the invention will automatically extract the environmental information through the available in-vehicle sensors, including the in-vehicle loudspeakers used as sound transducers as explained herein. The system processes this information to determine the type(s) of noise present in the ambient background and uses the processed information to select the optimal acoustic models for speech recognition. In addition, the ambient background information so obtained may be used to train different noise models for different noise conditions, as they are experienced during vehicle operation. The trained noise models may then be selected, based on current noise conditions, when recognition is performed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
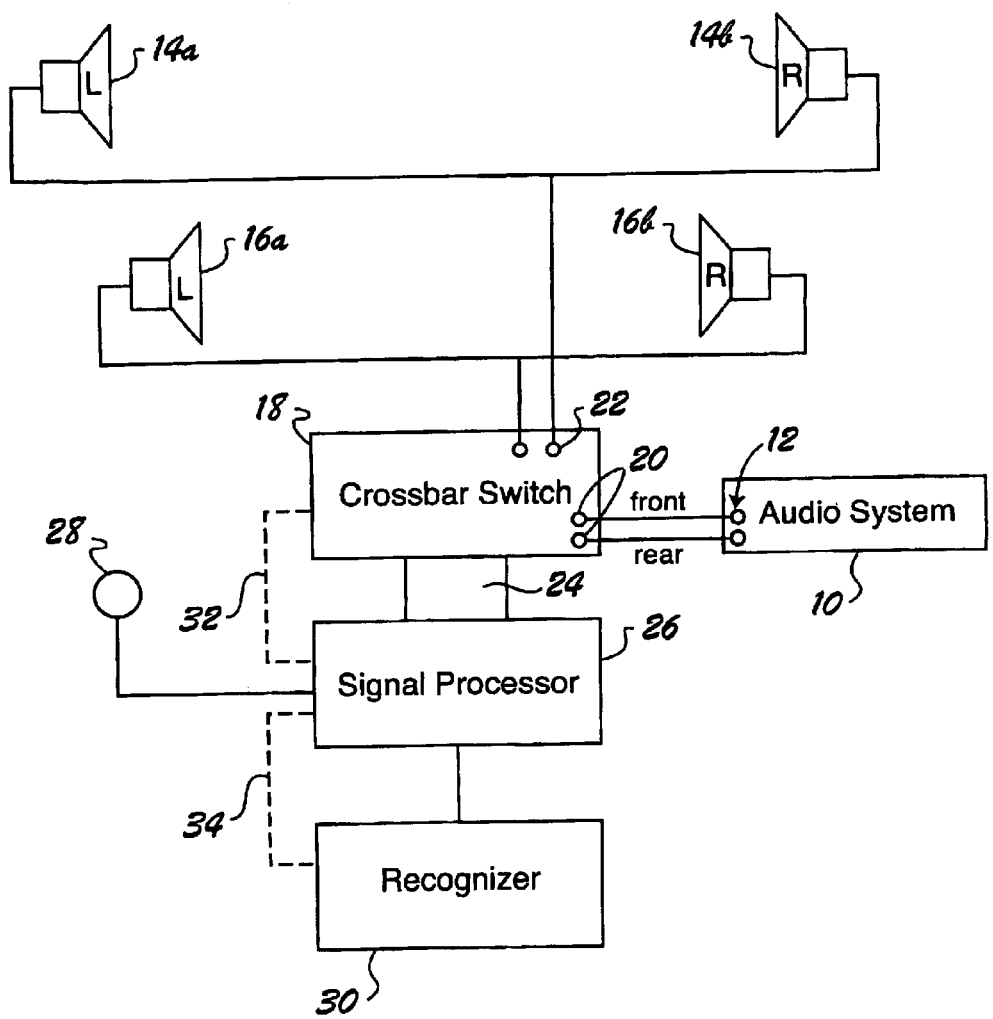
FIG. 1 is a block diagram illustrating a presently preferred embodiment of the improved recognition system.

FIG. 1 shows an exemplary embodiment of the improved speech recognizer system. In the illustrated embodiment the recognizer system is coupled to an audio system 10, which has a plurality of audio output ports, as at 12, through which audio output signals are provided. In the illustrated embodiment, the audio system 10 supplies audio signals to a set of front speakers 14a and 14b and a set of rear speakers 16a and 16b. The front and rear speakers each provide left channel and right channel information, respectively. In FIG. 1, a single line has been shown to represent the left-right stereo pair. This has been done to simplify the drawing. Those skilled in the art will appreciate that separate sets of conductors are normally used to supply the left and right channels, respectively.

The improved recognition system is incorporated into the audio system by provision of the crossbar switch 18. As illustrated, switch 18 has a plurality of input ports 20 to which the audio system 10 is coupled and a plurality of ports 22 to which the loudspeakers are coupled. The crossbar switch is further coupled through a signal processor input bus 24, which may include plurality of signal lines that communicate with the multi-channel signal processor 26.

Crossbar switch 18 has two switching states. In a first state the ports 20 are coupled to the ports 22. In this first state the audio system 10 is thus coupled to the loudspeakers, thereby allowing audio signals to be routed to the loudspeakers for playback in the usual fashion.

Crossbar switch 18 has a second switching state that decouples the loudspeakers from the audio system and instead couples the loudspeakers to the signal processor 26. In this second switching state the loudspeakers function as sound input transducers (i.e., as microphone devices).

In one embodiment the crossbar switch couples and decouples all loudspeakers simultaneously. In that embodiment, all loudspeakers are switched between audio playback state and sound input transducer state simultaneously. In an alternate embodiment, crossbar switch 18 is capable of independent speaker channel switching. In this embodiment a selected speaker can be switched from audio playback to sound input mode while the remaining loudspeakers remain in playback mode. If desired, the crossbar switch can be also provided with signal attenuators to reduce the sound output volume of loudspeakers in the playback mode when one or more loudspeakers have been switched to the sound input mode.

The signal processor 26 also includes an audio input to which a microphone 28 is coupled. Microphone 28 serves as the primary input for receiving voiced commands that are then processed by the speech recognizer 30. Signal processor 26 digitizes the audio input signals from microphone 28 and from the input channels 24 and then processes the resulting digital data to optimize it for use by the recognizer 30. Such optimization can include performing noise cancellation algorithms (discussed below) and speaker localization or source separation algorithms (also discussed below).

In the embodiment illustrated in FIG. 1, signal processor 26 also effects software control over the crossbar switch 18 via the control line 32 shown in dotted lines in FIG. 1. When a user utters a voiced command, the command is initially picked up by microphone 28. Signal processor 26, upon detecting speech input from microphone 2B, sends a control signal to the crossbar switch, causing it to switch to the sound input mode for one or more of the loudspeakers 14a, 14b, 16a, and 16b. In this embodiment the signal processor thus automatically switches the system for improved recognizer performance based on receipt of a voice command through microphone 28.

This automatic operation can be accomplished in a variety of ways. One way uses the signal processor 26 to continually monitor the sound input level and other spectral characteristics of the input from microphone 28. The signal processor acquires information about the ambient background noise by averaging the input signal from microphone 28 over a predetermined time interval that is substantially longer than the voiced commands for which the system is designed to recognize. The ambient background level is then subtracted out from the signal input from microphone 28, so that voiced command utterances are readily discriminated from the background ambient noise level.

If desired, the signal processor can also receive an audio signal through the input bus 24. This input signal can supply the signal processor with the audio signal being sent to the loudspeakers. By subtracting out this signal (which microphone 28 is picking up) the microphone can be made further sensitive to voiced commands.

An alternate processing technique relies upon recognizer 30 to recognize the voiced commands received through microphone 28 and initially processed by signal processor 26 without having information from the loudspeakers. In this alternate embodiment the recognizer can detect particular utterances, such as particular command words or phrases, and then send a control signal to signal processor 26, informing it that the crossbar switch 18 needs to be switched to the sound input mode. Thus, a particular voiced command by a user can be used to signal the system that it needs to switch to the sound input mode whereby one or more of the loudspeakers serve as auxiliary sound input transducers.

Another more sophisticated embodiment uses the confidence level achieved by the recognizer to determine when noise cancellation or other signal processing operations are needed. Upon detecting such conditions, the signal processor is notified via the control line 34 and it, in turn, signals the crossbar switch via line 32 to switch to the sound input state. This functionality may be implemented by monitoring the recognition score or probability of match score generated by the recognizer as it operates upon the input data. When recognition confidence drops below a predetermined level, the recognizer detects this and sends a control message to the signal processor 26.

Because the crossbar switch is under software control, by the signal processor 26 and also by the recognizer in some applications, the loudspeakers can be used to acquire useful information about the recognition environment that would not otherwise be available through the single microphone 28. In the environment learning mode, the loudspeakers are individually switched, one at a time, while a predetermined time segment of input sound is sampled and stored for further analysis. By cycling through all of the loudspeakers in this fashion, the system acquires spatial information about the sound field within which the microphone 28 is placed. Acquiring information of the sound field can be quite beneficial in fine tuning the signal processing algorithms used to enhance recognition. For example, if the system needs to recognize a particular person who is speaking among a group of persons, the sound field information can tell where that person is located relative to the others. Once the location has been determined, the utterances of the other persons can be rejected based on spatial cues.

The learning mode described above may be performed at very high speed by utilizing a solid-state crossbar switching circuit. Thus the system can cycle through successive loudspeakers, to acquire sound field information, without the audio content of the playback material being noticeably degraded.

Figure 2:
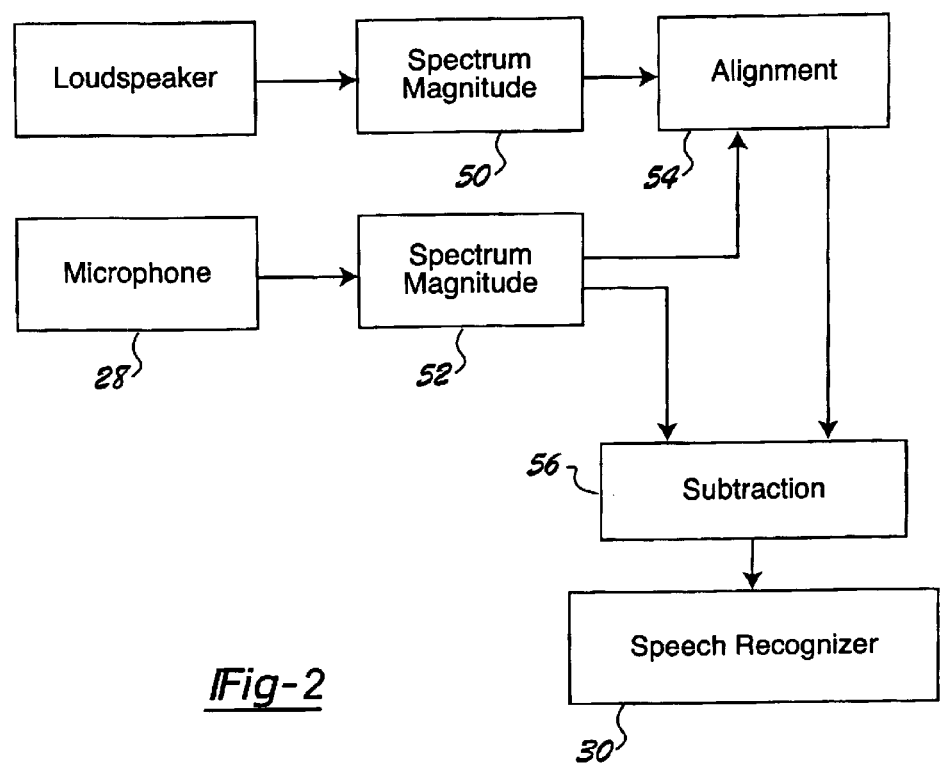
FIG. 2 is a signal processing diagram illustrating the spectrum magnitude method applied by the signal processing system.

FIG. 2 shows a signal processing algorithm that may be used to enhance recognizer performance. As illustrated, signals from the loudspeakers and microphone, respectively, are converted into the spectrum magnitude domain by processing blocks 50 and 52, respectively. An alignment operation is then performed at 54 and the resulting aligned signal is then subtracted from the spectrum magnitude signal originating from microphone 28. After subtraction as at block 56, the processed signal is then passed to the recognizer 30.

Processing in this fashion effectively subtracts the background noise from the speech, so that the speech can be processed more effectively by the recognizer 30. The processing operation is typically calibrated prior to use by allowing the reference microphone to sample only background noise. If the reference microphone receives both speech and noise, then a source separation technique may be used. The source separation technique uses independent component analysis (ICA) to separate the speech and noise. The microphone will have speech and noise, and the loudspeakers being used as sound input transducers will also have speech and noise, but with a different transfer function. In the frequency domain these two input signals can be written according to the matrix equation below:

$$\begin{bmatrix} m_1 \\ m_2 \end{bmatrix} = \begin{bmatrix} a_{11} & a_{12} \\ a_{21} & a_{22} \end{bmatrix} \begin{bmatrix} s \\ n \end{bmatrix} = M \begin{bmatrix} s \\ n \end{bmatrix}$$

In the above matrix equation $M_1$ and $M_2$ are the two input signals, while $a_{11}$, $a_{12}$, $a_{21}$ and $a_{22}$ are transfer functions. The s and n terms are speech and noise, respectively. If the matrix M is not singular, the signal and noise signals can be recovered by:

$$\begin{bmatrix} s \\ n \end{bmatrix} = M^{-1} \begin{bmatrix} m_1 \\ m_2 \end{bmatrix}$$

The independent component analysis will find the inverse of M, using a gradient descent algorithm. The recovered speech is then fed to the speech recognizer 30. If applied directly to the sound signal, ICA can take a considerable amount of computational power. This power can be substantially reduced if the signal is split into frequency bands and ICA is applied, band by band. The frequency band representation may be sent directly to the recognizer.

Figure 3:
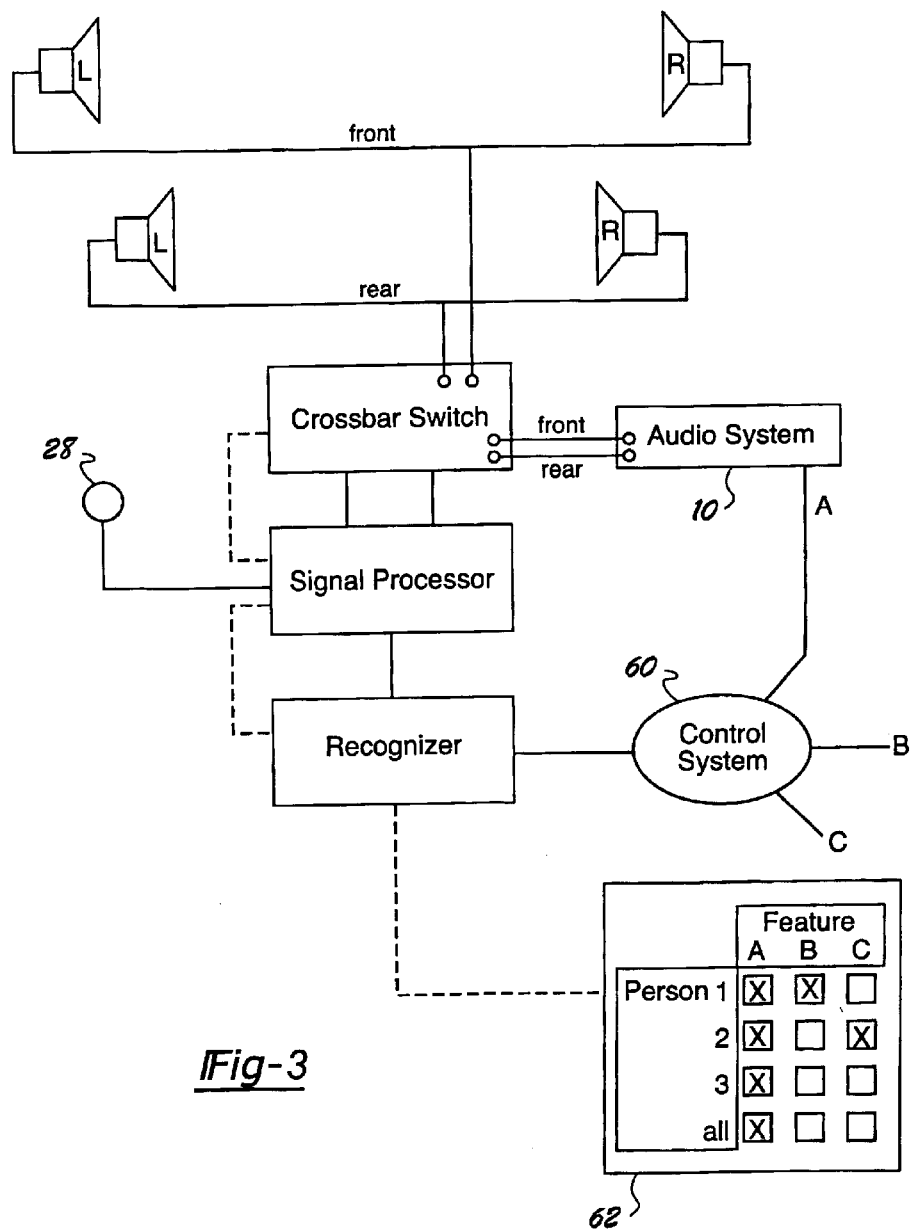
FIG. 3 is a detailed block diagram of an embodiment of the speech recognition system, illustrating how system control functions can be implemented through voiced commands.

Referring now to FIG. 3, an exemplary application of the improved recognizer is illustrated. Many of the component parts illustrated have been described above and will not be repeated here. As illustrated in FIG. 3, the recognizer is coupled to a control system 60, which may, in turn, be coupled to the audio system 10 (or audio/video system). The control system can also be connected to other devices for which operational control is desired. The control system may be provided with a memory for storing a feature set database illustrated diagrammatically at 62. The feature set database stores the identity of various devices and operational features and functions of those devices in association with the identity of different persons who will be using the system. The feature set database is used to dictate which of the various control functions certain individual persons have authority to operate. In an automotive application, for example, certain vehicular functions may be designated for the vehicle driver only. Using information about the spatial location of the vehicle occupants, the system is able to ascertain whether the driver or one of the passengers has uttered a particular voice command. It the command is one that is reserved for the driver only, it will be performed only if the driver utters it. The command will be ignored if other vehicle occupants utter it.

While it should be apparent that the recognition system of the invention can be used in a variety of different applications, two examples of such systems will be provided next in order to illustrate some of the ways that the invention may be deployed.

Figure 4:
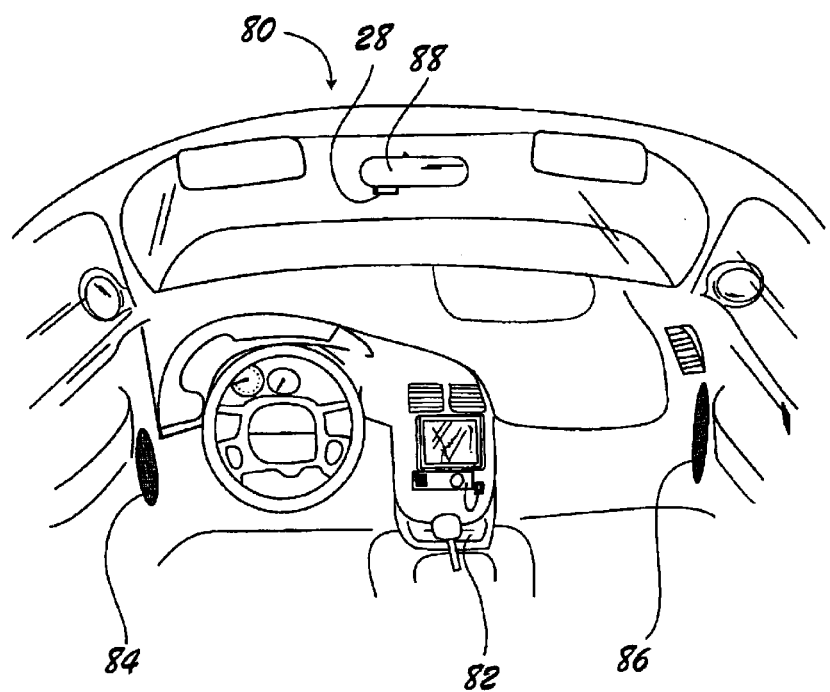
FIG. 4 is a perspective view of an automobile cockpit, illustrating how the invention may be integrated into the audio system of the vehicle.

Referring to FIG. 4, a vehicle cockpit is shown at 80. The vehicle audio system is shown at 82, with two of the audio system loudspeakers illustrated at 84 and 86. Other loudspeakers would be also provided in other locations of the vehicle (not shown). A microphone 28 is provided in a suitable location, such as within the rearview mirror assembly. If desired, the rearview mirror assembly may also have a system activation button 88 that the user presses to turn on the recognition system. Such button is optional, as the recognition system can be configured to work automatically, as described previously. The recognizer of the invention can be housed in a suitable package having connectors for plugging between the audio system 82 and the loudspeakers. The package is designed to accept the standard wiring harness plugs and jacks found within the vehicle. This has an advantage in that the wiring harness and loudspeaker installation may be the same for vehicles with speech recognition and without it. This saves on manufacturing and inventory costs.

Figure 5:
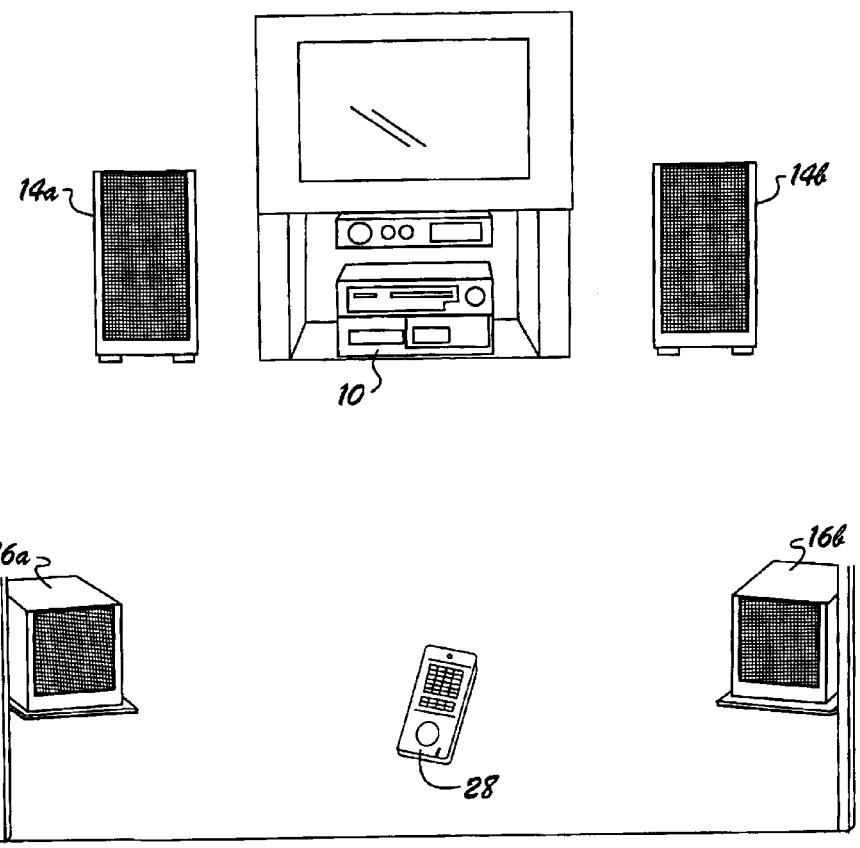
FIG. 5 is a diagrammatic view of an audio/video system, illustrating an embodiment of the recognition system suitable for control of home electronic components by voiced command.

FIG. 5 illustrates a home entertainment system with the recognition system employed. In the home entertainment system, the microphone 28 may be placed in a suitable location, such as at a fixed location within the viewing room, or within the remote control of one of the components. When placed in the remote control, wireless or infrared communication may be used to communicate the spoken utterance back to the signal processing unit.

In some implementations, it may be beneficial to provide the recognizer with different acoustic models for different noise conditions. The recognizer system of the invention makes provision for this using ambient noise measuring and acoustic model selection system illustrated in FIG. 6. The system maintains a pool of acoustic models, stored in acoustic model memory 100. An intelligent decision logic unit 102 predicts or determines the current noise conditions based on a variety of factors that are supplied as inputs to the logic unit 102, as illustrated. The logic unit supplies an ambient noise identification signal at 104 to an acoustic model selection module 106. The selection module 106 selects the appropriate acoustic model from memory 100, based on the signal at 104 and supplies this model to the model adaptation module 108. Model selections can be made prior to and/or during the recognition session. Module 108, in turn generates or supplies the adapted model to the pattern matching engine 110 of the recognizer. The intelligent decision logic unit 102 may also be configured to supply a control signal at 112 to provide background noise information to the model adaptation module 108.

Figure 6:
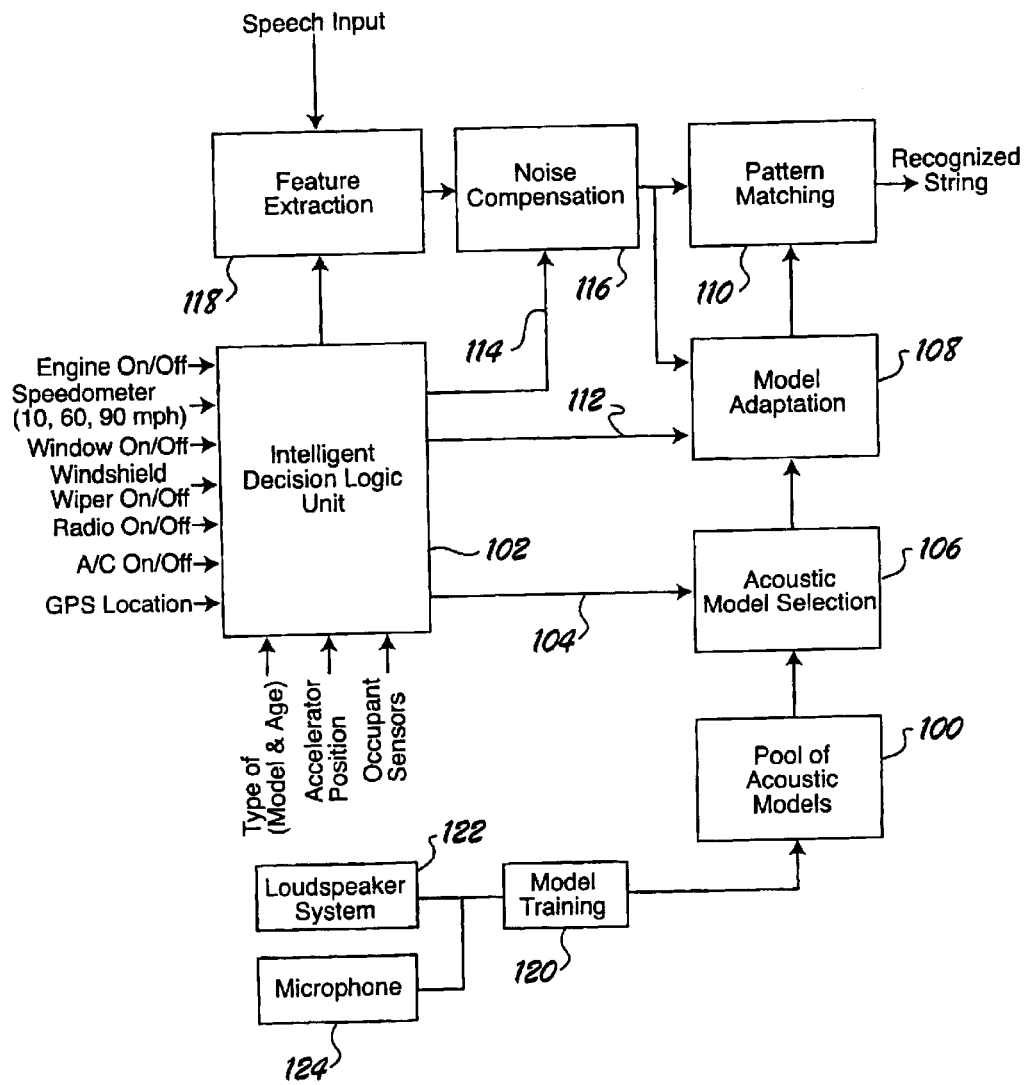
FIG. 6 is a block diagram of the inventive system for training and using noise models adapted to different noise conditions within the vehicle.

In addition to providing adapted acoustic models for recognition, the system may also be configured to perform noise compensation upon the input speech signal prior to recognition and/or to change compensation parameters during a recognition session. As illustrated in FIG. 6, an ambient noise identification signal is supplied at 114 to a noise compensation module 116. Signal 114 provides the noise compensation module with information about the type of noise in the current ambient background. The noise compensation module performs processing of the input speech signal to remove or reduce the effects of the noise. In a presently preferred embodiment, noise compensation is performed in a parametric domain, after the input speech signal has been processed by the feature extraction module 118, as illustrated.

The front-end (noise compensation) processing operations can be selected according to current noise conditions. If the noise is minimal, then perceptual linear prediction features can be selected for recognition. If the noise is greater then a sub-band feature can be selected for recognition. If the noise is null, Mel frequency cepstral coefficient features may be selected.

While there can be a wide assortment of different factors that affect what noise is present in the ambient background, the following are offered as some examples. Suitable sensors would be provided to capture the following operating parameters:

Engine is on or off.

Speed of the vehicle, e.g., 30 mph (residential), 40 mph (city), 65 mph (highway).

Accelerator position (the speed will be lower if the vehicle is climbing a mountain, but the accelerator will be more fully depressed and engine noise will be greater).

Engine rpm.

Age of the vehicle.

Model of the vehicle (sports car, family sedan, minivan, SUV, motor home, school bus, etc.). This information can also serve to inform the logic unit of the number of speakers that can be estimated a-priori.

Window open or closed.

Sensors under vehicle seat(s) or at the entrance of each door, so the system can precisely estimate the number of persons inside the vehicle. (Pets, like cats and dogs, can be recognized similarly, and the system will detect that these occupants will not be providing speech input to be recognized.)

Windshield wipers on and off.

Convertible top up or down/sunroof open or closed.

Radio, music, dvd on or off.

Global Positioning Satellite (GPS)—vehicle location. This information is used to learn street location. The type of roadway surface can be stored for each location and this information used to predict noise level. In this regard, a concrete roadway provides a different background noise than a blacktop, gravel or dirt surface. In addition, the background noise associated with each type of surface changes differently when wet. GPS information may also be used to determine whether the vehicle is approaching a train track (railway crossing) or moving near the ocean (surf noise) or climbing up a mountain.

Real-time weather and traffic conditions.

Air conditioning system is on or off.

The acoustic models stored in memory 100 can be pre-configured and downloaded through suitable data connection, such at a vehicle service center or via vehicle internet connection. Alternatively, the system can measure background noise, using the sound transducers as described herein, and then generate its own acoustic models. Generating the models itself, allows the models to become adapted as the vehicle age changes. As the vehicle ages, its noise characteristics change (more rattles, louder muffler, etc.).

The acoustic models may be trained according to most of the noisy conditions and the best fitting model is selected according to the deterministic information from all of the sensors (described above). Model adaptation can also be done on the selected model to enhance the inter-speaker and intra-speaker variabilities. FIG. 6 thus illustrates a model training module 120 that provides new models, or re-trains existing models within memory 100. The model training module receives information about ambient noise conditions from the loudspeaker system 122, and/or from microphone 124.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A signal processing system to improve speech recognition, comprising:

a loudspeaker system for playback of audio content;

a sound transducer for input of speech utterances from a recognition system user;

a multi-channel signal processing system configured to receive speech utterance input from said sound transducer and from at least one additional audio source, the signal processing system being operative to enhance the recognition quality of the received speech utterance;

a switching system coupled to said signal processing system and to said loudspeaker system, the switching system being operative to selectively couple said loudspeaker system to said signal processing system thereby utilizing said loudspeaker system as said additional audio source.

2. The system of claim 1 wherein said signal processing system is configured to increase discrimination between speech utterances produced by one source from sounds produced by other sources.

3. The system of claim 1 wherein said signal processing system is configured to perform source separation.

4. The system of claim 1 wherein said signal processing system is configured to perform source separation using independent component analysis to separate speech from noise.

5. The system of claim 4 wherein said independent component analysis is performed in the frequency domain.

6. The system of claim 1 further comprising a recognizer coupled to said signal processor.

7. The system of claim 6 further comprising a control system coupled to said recognizer and operative to control a function of an electronic component.

8. The system of claim 7 wherein said electronic component is an audio system or audio/video system coupled to said loudspeaker system.

9. The system of claim 7 wherein said control system includes a memory for storing first data regarding electronic component function in association with second data indicative of at least one recognition system user.

10. The system of claim 9 wherein said control system uses said first and second data to selectively permit control of a function of an electronic component.

11. The system of claim 1 wherein said signal processing system controls said switching system.

12. The system of claim 6 wherein said recognizer controls said switching system.

13. A method of improving speech recognition, comprising:
    selectively interrupting playback of audio content through a loudspeaker system while concurrently utilizing said loudspeaker system as a sound input transducer;
    receiving an input speech utterance from a recognition system user through a plurality of transducers that include said loudspeaker system; and
    processing said received input speech utterance to enhance recognition quality.

14. The method of claim 13 wherein said step of selectively interrupting playback is performed automatically.

15. The method of claim 13 wherein one of said plurality of transducers is a microphone and wherein said step of selectively interrupting playback is performed in response to receipt of a speech utterance via said microphone.

16. The method of claim 13 wherein one of said plurality of transducers is a microphone and wherein said step of selectively interrupting playback is performed in response to speech recognition performed upon a speech utterance received via said microphone.

17. The method of claim 13 further comprising controlling at least one function of an electronic component based on the results of said step of performing recognition.

18. The method of claim 13 further comprising processing said received input speech utterance by performing source separation using separate signals input respectively through said loudspeaker system and through a microphone.

19. The method of claim 18 wherein said source separation is performed using independent component analysis to separate speech and noise.

20. The method of claim 13 further comprising using separate signals input respectively through said loudspeaker system and through a microphone to ascertain spatial information from the input speech utterance.

21. The method of claim 20 further comprising using said spatial information to discriminate between a plurality of concurrent recognition system users.

22. The method of claim 20 further comprising controlling at least one function of an electronic component based on the results of said step of performing recognition and further based on said spatial information.

23. A speech recognition system for incorporation into an automotive vehicle having an audio system with an associated loudspeaker system, comprising:
    a sound transducer for input of speech utterances from a recognition system user;
    a multi-channel signal processing system configured to receive speech utterance input from said microphone and from at least one additional audio source, the signal processing system being operative to enhance the recognition quality of the received speech utterance;
    a switching system coupled to said signal processing system and to said loudspeaker system, the switching system being operative to selectively couple said loudspeaker system to said signal processing system thereby utilizing said loudspeaker system as said additional audio source.

24. A speech recognition system for integrating into a home entertainment system having a loudspeaker system for playback of audio content, comprising:
    a sound transducer for input of speech utterances from a recognition system user;
    a multi-channel signal processing system configured to receive speech utterance input from said microphone and from at least one additional audio source, the signal processing system being operative to enhance the recognition quality of the received speech utterance;
    a switching system coupled to said signal processing system and to said loudspeaker system, the switching system being operative to selectively couple said loudspeaker system to said signal processing system thereby utilizing said loudspeaker system as said additional audio source.

25. A signal processing system to improve speech recognition, comprising:
    a loudspeaker system for playback of audio content;
    a microphone for input of speech utterances from a recognition system user;
    a multi-channel signal processing system configured to receive speech utterance input from said sound transducer and from at least one additional audio source, the signal processing system being operative to enhance the recognition quality of the received speech utterance;
    a switching system coupled to said signal processing system and to said loudspeaker system, the switching system being operative to selectively couple said loudspeaker system to said signal processing system thereby utilizing said loudspeaker system as said additional audio source.

26. A speech recognition system, comprising:
    a loudspeaker system for playback of audio content;
    a sound transducer for input of speech utterances from a recognition system user;
    a recognizer configured to receive speech utterance input from said sound transducer and configured to use at least one acoustic model in the recognition of said speech utterance input;
    an acoustic model selection system coupled to said recognition system and being operative to selectively control the acoustic model used by said recognition system based on at least one environment parameter;
    said acoustic model selection system further using said loudspeaker system to assist in determining the acoustic model used by said recognition system.

27. The recognition system of claim 26 wherein said sound transducer is a microphone.

28. The recognition system of claim 26 wherein said sound transducer is a loudspeaker coupled to receive audio input.

29. The recognition system of claim 26 wherein said acoustic model selection system includes a pool of acoustic models and operates to select a model from said pool for use by the recognizer, based on at least one environment parameter.

30. The recognition system of claim 26 wherein said loudspeaker system is coupled to receive audio input from the environment and the recognition system further includes acoustic model training module to provide at least one acoustic model for use by the recognizer.

31. The recognition system of claim 26 wherein said loudspeaker system is coupled to receive audio input from the environment and the recognition system further includes acoustic model training module to provide a plurality of acoustic models for use by the recognizer for different background noise conditions.

32. The recognition system of claim 26 further comprising a decision logic unit coupled to said model selection system that ascertains at least one vehicle operating parameter and causes the model selection system to change at least one aspect of the acoustic model used by the recognizer based on said operating parameter.

33. The recognition system of claim 26 further comprising a decision logic unit coupled to said model selection system that ascertains at least one vehicle environmental characteristic and causes the model selection system to change at least one aspect of the acoustic model used by the recognizer based on said environmental characteristic.

34. The recognition system of claim 26 further comprising a noise compensation module for performing signal processing prior to recognition, the noise compensation module being configured to selectively perform said signal processing based on said at least one environmental parameter.

35. The recognition system of claim 34 further comprising feature extraction module that processes said speech utterance input and wherein said noise compensation module operates upon a speech information signal derived from said feature extraction module.

36. A speech recognition system, comprising:
   a recognizer configured to receive speech utterance input from a sound transducer and configured to use at least one acoustic model in the recognition of said speech utterance input;
   an acoustic model selection system coupled to said recognition system and being operative to selectively control the acoustic model used by said recognition system based on at least one sensed operating parameter;
   a decision logic unit coupled to said module selection system that ascertains at least one vehicle operating parameter and causes the model selection system to change at least one aspect of the acoustic model used by the recognizer based on said operating parameter.

37. The speech recognition system of claim 36, wherein:
   said decision logic unit further ascertains vehicle location and causes the model selection system to change at least one aspect of the acoustic model used by the recognizer based on said location.

38. The speech recognition system of claim 36 wherein said acoustic model selection system is configured to selectively control the acoustic model used by the recognition system during an ongoing recognition session.

* * * * *